United States Patent [19]
Taub

[11] 4,114,291
[45] Sep. 19, 1978

[54] TABLE WITH INTEGRAL PROJECTOR

[75] Inventor: Herman P. Taub, Westport, Conn.

[73] Assignee: Mediax, Inc., Westport, Conn.

[21] Appl. No.: 785,199

[22] Filed: Apr. 6, 1977

[51] Int. Cl.² .......................................... G09B 11/00
[52] U.S. Cl. .......................................... 35/36; 35/26; 35/60; 353/77; 353/119
[58] Field of Search .................. 35/9 E, 9 F, 22 R, 26, 35/36, 37, 60; 352/104, 242; 353/74, 77, 119

[56] References Cited

U.S. PATENT DOCUMENTS

| | | | |
|---|---|---|---|
| 1,559,665 | 11/1925 | Beery et al. | 35/26 |
| 2,286,331 | 6/1942 | Berger et al. | 35/37 X |
| 2,958,956 | 11/1960 | Olalainty | 35/22 R |
| 3,162,959 | 12/1964 | Woolman | 35/9 E |
| 3,332,317 | 7/1967 | Peckman et al. | 35/26 X |
| 3,382,592 | 5/1968 | Lucero | 35/37 |
| 3,662,077 | 5/1972 | Kersten | 35/37 |
| 3,680,224 | 8/1972 | Hall | 35/9 E |
| 3,690,020 | 9/1972 | McBratnie | 35/37 |
| 3,800,441 | 4/1974 | MacPherson | 35/26 |
| 3,968,575 | 7/1976 | Van Wilson | 35/9 E X |

FOREIGN PATENT DOCUMENTS 12,935 of 1928 Australia .................................. 353/74

Primary Examiner—William H. Grieb
Attorney, Agent, or Firm—Garold E. Bramblett, Jr.

[57] ABSTRACT

A table for use in teaching children, particularly those with learning disabilities. The table includes a translucent top upon which a paper worksheet can be placed. An optical projector is mounted below the table top to direct an image onto the translucent table top. The image is seen through the paper worksheet and may be followed or traced by the child to develop psychomotor brain patterns.

8 Claims, 5 Drawing Figures

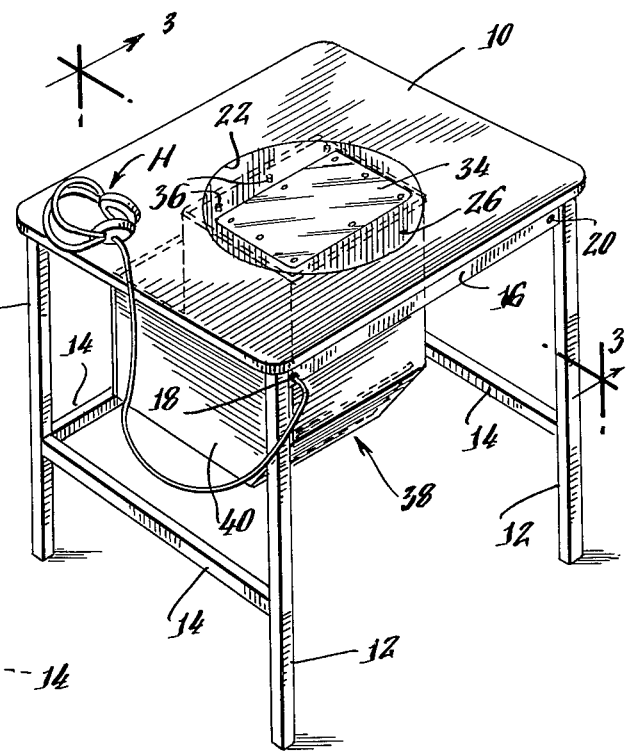
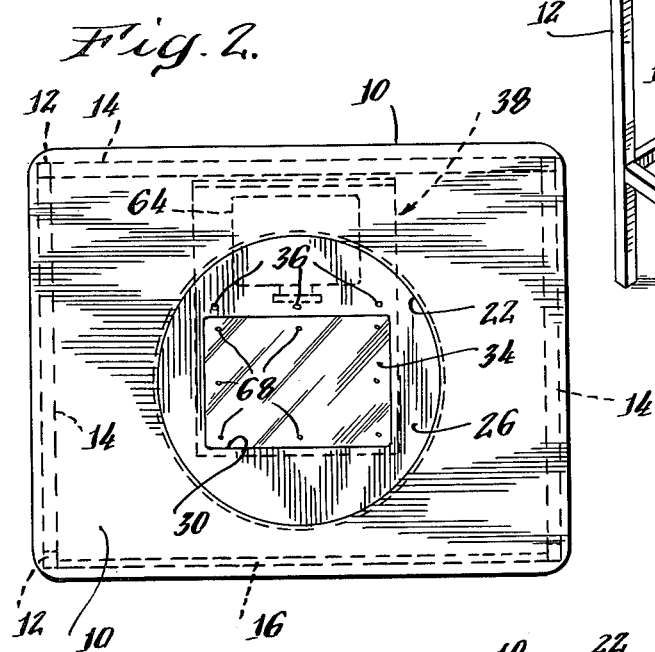
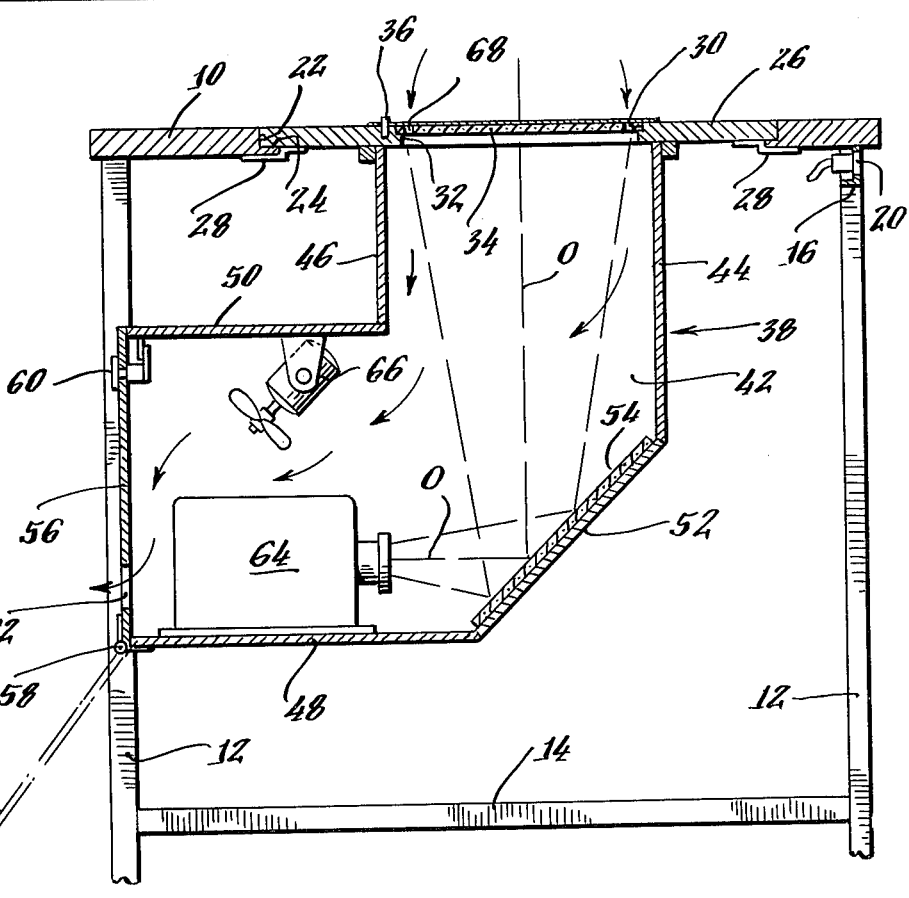

TABLE WITH INTEGRAL PROJECTOR

BACKGROUND OF THE INVENTION

Many learning disabled children are victims of perception related disorders. These children have great difficulty in transferring the stimulus received through one sense, such as vision or hearing, into the motor functions of printing, writing or drawing. These children require practice in the motor skills but are unable to achieve such practice by reason of their incapability of transferring the stimulus received by one part of the brain to the motor controlling function of a different part of the brain.

It has been learned, however, that motor functions externally controlled and repeated often enough can establish themselves in the brain. This is known as "patterning." Severely retarded and brain injured children, for example, have been taught to crawl and then to walk by the patient work of volunteers placing their limbs in the proper positions until the correct pattern has been established in the brain. Until the present invention, however, no similar technique has been available for patterning the fine motor skills of writing, while bypassing the troublesome perceptual transfer problem.

It is a primary object of the present invention to provide an educational device for presenting to a child a preprogrammed instruction which may be manually traced by the child with a minimum of perceptual transfer being required. Another object is to provide such a device in the form of a table substantially similar in form to a conventional work table. Other objects, features, and advantages will become apparent from the following description and appended claims.

The closest prior art known will be found in the following United States patents:

U.S. Pat. No. 2,958,956 by Olalainty;
U.S. Pat. No. 3,332,317 by Peckman et al;
U.S. Pat. No. 3,382,592 by Lucero;
U.S. Pat. No. 3,662,077 by Kersten;
U.S. Pat. No. 3,690,020 by McBratnie;
U.S. Pat. No. 3,800,441 by Macpherson.

SUMMARY OF THE INVENTION

A table for use in teaching motor skills which includes a top and supporting legs. At least a portion of the top is translucent and means are mounted below the top for supporting an optical projector which is positioned to direct an image onto the translucent portion. Other means are provided for retaining a worksheet on the upper surface of the translucent portion in registry with the image.

BRIEF DESCRIPTION OF THE DRAWINGS

FIG. 1 is a perspective view of a table constructed in accordance with the present invention;

FIG. 2 is a top plan view of the table of FIG. 1;

FIG. 3 is an enlarged cross section taken substantially along the line 3—3 of FIG. 1;

DESCRIPTION OF THE PREFERRED EMBODIMENT

Figure 4:
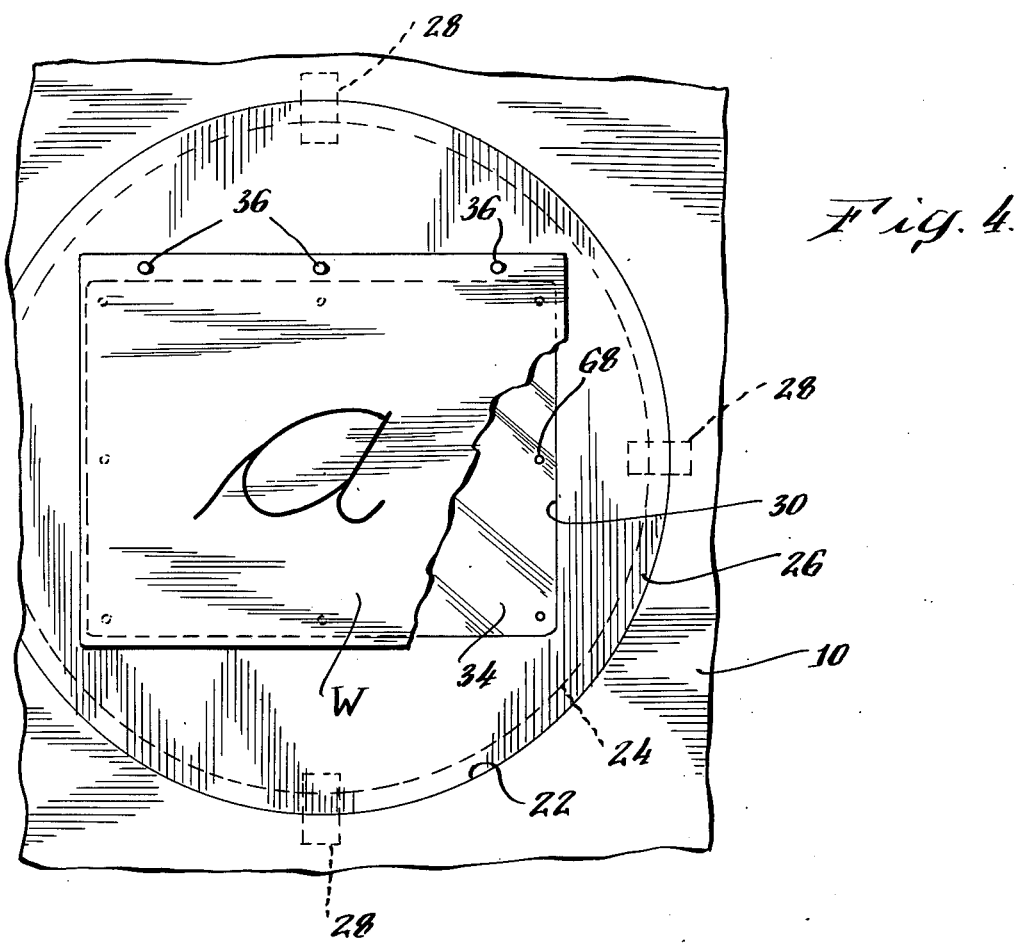
FIG. 4 is an enlarged, partial plan view of the top of the table illustrating the manner in which the worksheet is retained; and, FIG. 5 is a top plan view of the table of the invention showing the manner in which the translucent portion may be rotated.

With particular reference to FIG. 1, there is illustrated a table in accordance with the present invention comprising a substantially rectangular top 10 supported on vertical legs 12 having conventional horizontal braces 14 along the back and sides. Beneath the top of the table, along its front edge between two of the legs 12, is an angle iron 16 which carries a headphone jack 18, 20 at each end. The top 10 of the table defines a circular opening 22 including an annular lower lip 24. Rotatably positioned within the opening 20 and resting on the lip 24 is a disk 26 which is preferably opaque and may be of the same material as the table top. The disk 26 is secured in position within the opening 22 by means of a plurality of Z-shaped metal clips 28. One leg of each of the clips 28 is secured to the underside of disk 26 while the other leg extends slidably beneath the table top 10 as shown in FIG. 3. The disk 26 defines a rectangular opening 30 having an underlying lip 32. Positioned within the opening 30 and resting upon the lip 32 is a glass or plastic insert 34 having transparent or translucent qualities. Mounted within the disk 26 and aligned along one edge of the insert 34 is a row of three vertical pegs 36.

Fixedly secured to the bottom of the disk 26 and depending downwardly therefrom is an L-shaped, boxlike compartment 38. The compartment 38 comprises a pair of vertical side walls 40, 42, vertical front wall 44, and back wall 46, and horizontal base wall 48 and top wall 50. Extending between the side walls 40, 42 and adjoining front wall 44 and base wall 48 is an inclined wall 52 set at a 45° angle and having mounted on its inner surface a plane mirror 54. The rear of the compartment 38 is closed by a door 56 connected to base wall 48 by a hinge 58 and securable by a latch 60. The door 56 defines ventilation openings 62.

Mounted within the compartment 38 on the base wall 48 is a cassette type optical projector 64. The projector is positioned to direct an image along optical axis 0 which is reflected upwardly and against the glass insert 34 by the mirror 54. A fan 66 is mounted against the top wall 50 to provide cooling. The fan also creates a slight vacuum within the compartment 38 which serves to secure a student's worksheet to the insert 34. This is accomplished by means of a series of small holes 68 which extend through the insert 34 around its periphery as shown in FIG. 4. A headset H, as shown in FIG. 1, may also be employed in conjunction with the projector and is plugged into one of the jacks 18 or 20. The remaining jack may be used for a teacher's headset.

OPERATION

Figure 5:
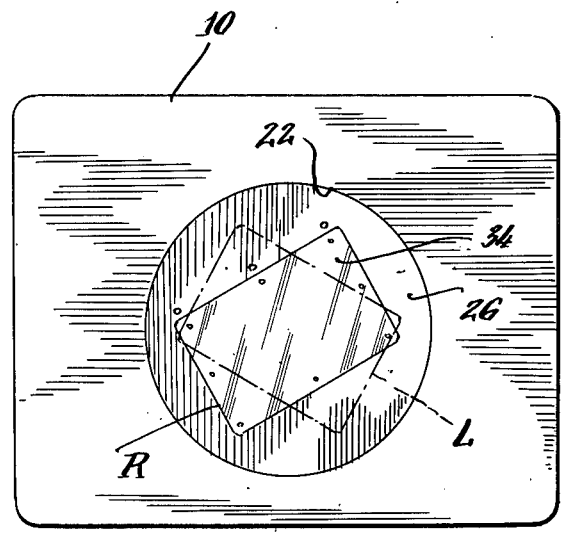

For instructional use, a worksheet W having prepunched marginal holes is placed upon the insert 34, as shown in FIG. 4, with the prepunched holes being engaged by the pegs 36. The disk 26 may be rotated to place the worksheet in the most desirable orientation. For example, in FIG. 5, one orientation R may be selected for a righthanded student and an orientation L for a lefthanded student. It is important to note that rotation of the disk 26 and insert 34 is accompanied by rotation of the compartment 38 and the optical projector 64 therein. In this manner, the orientation of the projector image is always aligned with the worksheet W. Accordingly, it is possible to align the projected image with preprinted indicia on the worksheet.

The image which is projected by the projector 64 passes through the worksheet from below so that it cannot be obscured by any portion of the student's body. The type of image which may be projected is virtually unlimited. It may be, for example, in the form of various geometrical shapes, letters, figures and mathematical symbols. Various colors may also be projected. In the teaching of cursive writing, a small spot of light may be caused to move along the surface so as to trace, for example, a letter as shown in FIG. 4. As the child is performing the manual task of, for example, tracing a letter, he may also be instructed through the headset H.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims. As used therein, the term "translucent" is to be interpreted as including "transparent."

What is claimed is:

1. In a table for use in teaching motor skills including a top and supporting legs, the improvement which comprises: a disk insert in said top rotatable relative thereto about an axis normal to said top, said insert having a translucent portion therein; means mounted below said top for supporting an optical projector positioned to direct an image onto said translucent portion, said projector support means being rotatable with said disk insert relative to said top; and means for retaining a worksheet on the upper surface of said translucent portion in registry with said image.

2. The improvement of claim 1 wherein said projector support means comprises a compartment depending from said rotatable disk.

3. The improvement of claim 2 wherein said compartment comprises: means for supporting an optical projector therein with its optical axis substantially horizontal; and reflector means positioned to redirect said optical axis onto said translucent portion.

4. The improvement of claim 2 wherein said table top includes means for aligning a worksheet supported on said translucent portion.

5. The improvement of claim 4 wherein said alignment means comprises a plurality of vertically extending pegs.

6. The improvement of claim 4 wherein said disk includes means for frictionally engaging said worksheet.

7. The improvement of claim 6 wherein said engaging means comprises: vacuum openings defined by said disk to underlie said worksheet; and vacuum inducing means within said compartment.

8. The improvement of claim 4 wherein said compartment comprises: means for supporting an optical projector therein with its optical axis substantially horizontal; and reflector means positioned to redirect said optical axis onto said translucent portion.

* * * * *